Feb. 6, 1962 J. G. ISABEAU 3,020,401

HIGH FREQUENCY RECEIVER WITH RESONANT CAVITY

Filed Jan. 11, 1960 2 Sheets-Sheet 1

JOHN G. ISABEAU
*INVENTOR.*

*BY* Flehr and Swain
ATTORNEYS

HIGH FREQUENCY RECEIVER WITH RESONANT CAVITY

Filed Jan. 11, 1960 2 Sheets-Sheet 2

JOHN G. ISABEAU
*INVENTOR.*

*BY*

ATTORNEYS 3,020,401
Patented Feb. 6, 1962

3,020,401

HIGH FREQUENCY RECEIVER WITH RESONANT CAVITY

John G. Isabeau, Mountain View, Calif., assignor to RS Electronics Corporation, Palo Alto, Calif., a corporation of California Filed Jan. 11, 1960, Ser. No. 1,536
9 Claims. (Cl. 250—20)

This invention relates generally to receivers and more particularly to high frequency heterodyne receivers employing a resonant cavity in the radio-frequency section.

In general, heterodyne receivers must be capable of rejecting image frequencies. In low frequency receivers, simple tuned circuits are satisfactory. However, in high frequency receivers, resonant distributed constant circuits such as coaxial cavities are required in the radio-frequency section. In certain prior art receivers, coaxial cavities have been employed. These cavities are, in general, relatively expensive to manufacture, occupy a large volume and are relatively heavy. When weight and volume become important considerations, receivers including these cavities are not ideally suited.

In heterodyne receivers of the foregoing character, it is often desirable to use transformer coupling from the local oscillator to the receiver in order to provide both impedance matching and a simple bias circuit. However, because of the relatively high frequencies involved, conventional radio-frequency transformers are inefficient and difficult to manufacture. In receivers of the foregoing character, it is also desirable to minimize coupling between the input circuits and the remainder of the receiver, particularly between the first mixer stage and the input radio-frequency section to reduce radiation.

It is, in general, an object of the present invention to provide an improved high frequency receiver.

It is another object of the present invention to provide a receiver which includes a relatively inexpensive input resonant circuit.

It is a further object of the present invention to provide a high frequency receiver in which there is minimum coupling between the first mixer and the radio-frequency section.

It is a further object of the present invention to provide a receiver which has improved coupling between the antenna to the radio-frequency input circuit.

It is still a further object of the present invention to provide a receiver in which the chassis forms part of the resonant cavity and the antenna is externally coupled to the cavity.

It is still a further object of the present invention to provide a high frequency receiver in which the parts are compactly arranged.

These and other objects of the invention are achieved by providing an input circuit which includes a resonant cavity formed by a portion of the chassis and which includes a cavity loop extending from within the cavity to a point outside the cavity. The antenna is coupled to the external portion of the cavity loop by an antenna loop. The input to the mixer is applied from a loop which is disposed within the cavity and coupled to the cavity loop. The output of the local oscillator is coupled to the mixer by a high Q loop drive disposed adjacent to and external of the cavity.

The foregoing objects and others will become more clearly apparent from the following description when taken in conjunction with the accompanying drawings.

Referring to the drawings.

Figure 3:
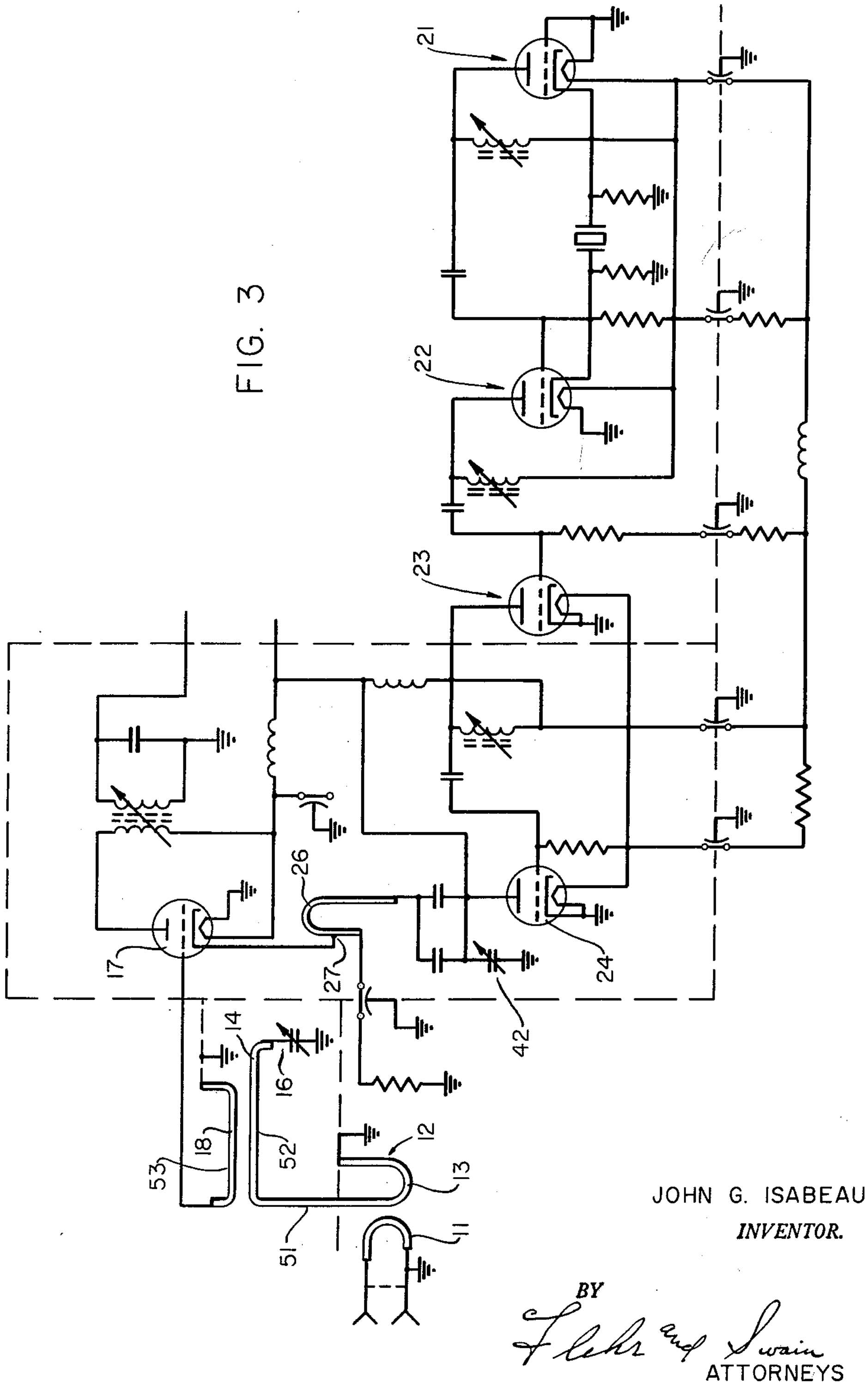
FIGURE 3 is a schematic diagram of the input circuits, radio-frequency mixer and local oscillator.

Reference is first made to the schematic circuit diagram of FIGURE 3. The antenna is coupled by an antenna loop 11 to a cavity loop 12 which has a portion 13 external of the cavity, to be presently described, and a portion 14 internal. The length of the loop is approximately one-eighth wavelength. A variable capacity 16 has a reactance equivalent to one-eighth wavelength whereby the electrical length of the cavity is adjustable and substantially one-quarter wavelength. The radio-frequency signal in the cavity is coupled to the input of the first mixer 17 by a loop 18.

A local frequency is derived by a crystal oscillator including the tube 21 and multiplied by the frequency multiplying stages including the vacuum tubes 22 and 23, and applied to the driver stage including tube 24 which may also be used as a last multiplier. The plate circuit of the driver tube 24 is connected to a high "Q" loop 26 which acts as coupling to the mixer tube. It is noted that the output from the loop 26 is obtained by tapping off at 27 to provide an impedance match between the high impedance plate circuit of the tube 24 and the low impedance input circuit of the mixer tube 17. The high "Q" loop is selected to be tuned at the local frequency with the help of tuning capacitor 42.

Figures 1, 2:
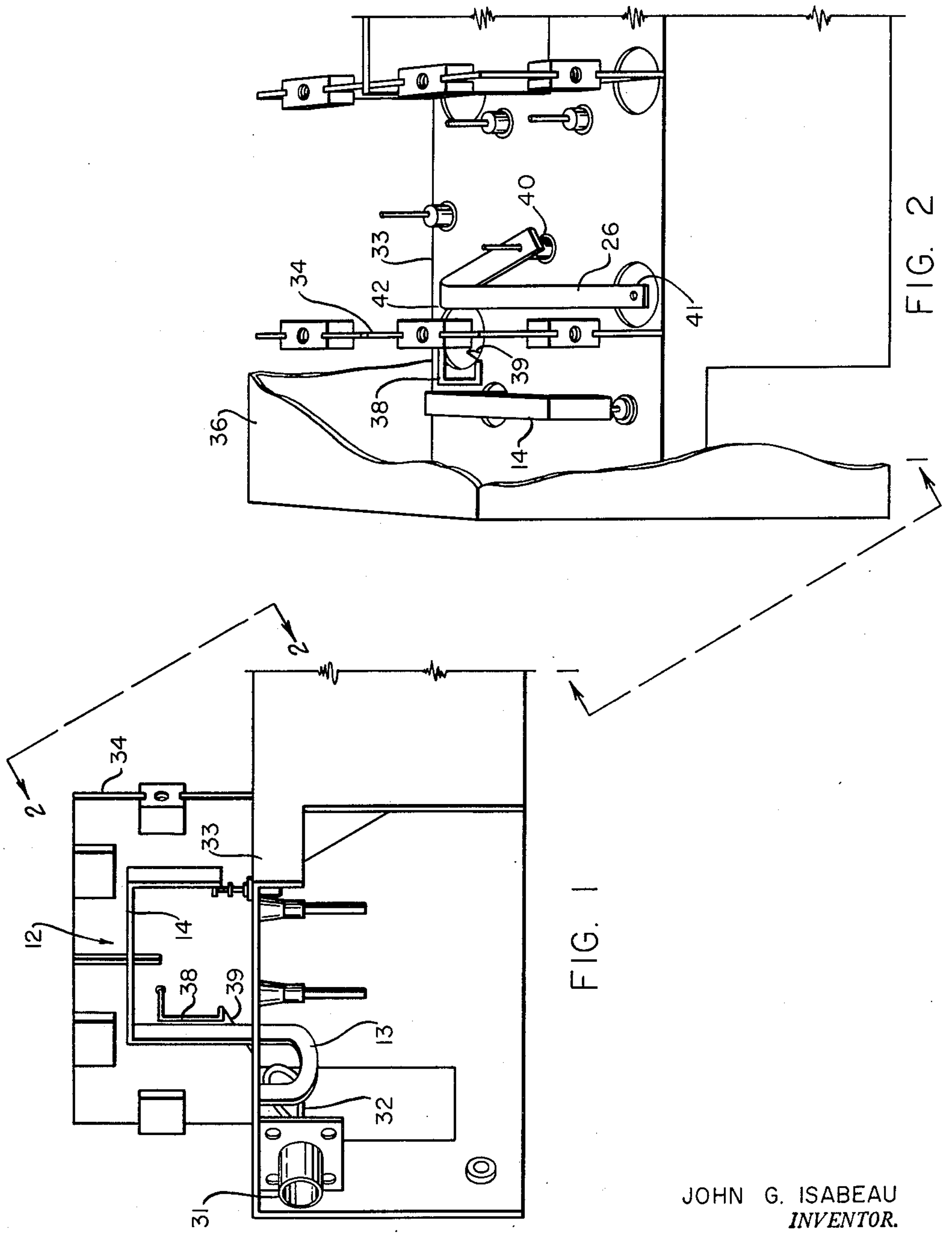
FIGURE 1 is a view taken substantially along the line 1—1 of FIGURE 2.
FIGURE 2 is a view taken along the line 2—2 of FIGURE 1.

Referring now to FIGURES 1 and 2, the antenna is connected to the coaxial connector 31 which is provided with a coupling loop 32 placed adjacent the external portion 13 of the cavity loop 12. The cavity loop extends within the cavity and has its end capacitively connected to the chassis 33. Thus, the loop has one end directly connected to the chassis, while the other end is capacitively coupled to the chassis. As previously described, the electrical length of the loop together with the capacitive coupling is substantially one-quarter wavelength. It is observed that there is no direct electrical connection between the antenna loop 32 and the input cavity. Thus, ground currents will not feedback into the antenna to re-radiate.

The chassis 33 includes upwardly extending wall portions 34 adapted to receive a cover 36. An output coupling loop 38 has one end secured to the partition 34 and its other end is connected to the input terminal of the mixer tube 17 by the line 39. The spacing between the straight portion of the loop 38 and the adjacent straight portion of the loop 12 is selected to give the desired coupling between the loops to drive the mixer 17. It is observed that by locating the input loop 38 on the partition wall, any ground currents flowing along the chassis will not be coupled into the mixer.

The input from the local oscillator is applied to the end 41 of the loop 26 and is coupled off in the region 42. The other end of the loop 26 is connected to the chassis through a decoupling capacitor 40, here in the form of a feedthru capacitor, acting as a short circuit at high frequency.

It is observed that the overall construction is relatively simple and inexpensive, employing the chassis 33 and cover 36 to form the cavity portion while the various coupling loops are relatively simple in construction and made from strips of conductive material.

A receiver was constructed in accordance with the foregoing in which the cavity had a length of 2.0 inches, height of 1.0 inch, and a width of 1.125 inches. The antenna coupling loop 11 was 1.5 inches long and had a diameter of approximately 0.30 inch. The cavity loop 14 was 3.2 inches long, and the hairpin portion 13 had a radius of 0.25 inch. The straight portion 51 was 0.875 inch long and the straight portion 52 was 1.0 inch long. The output loop 18 was 1.0 inch long with the straight portion 53 0.5 inch long and spaced 0.125 inch from the respective cavity loop.

The input frequency from the antenna was 413.0 megacycles; the input from the local oscillator was 373.5 megacycles; and the output frequency from the mixer was 39.5 megacycles. The response of the receiver to image frequencies was down 36 db.

I claim:

1. A receiver comprising a chassis for mounting the component parts, a cover cooperating with said chassis and forming a cavity, a cavity loop disposed within said cavity and having an external portion, means for indirectly coupling an antenna to the external portion of said cavity loop, a mixer, and means for coupling the cavity signals to the mixer.

2. A receiver as in claim 1 wherein the cavity loop is directly connected to the chassis on one end and capacitively coupled on the other.

3. A receiver as in claim 1 wherein the antenna is coupled to the cavity loop by an antenna loop.

4. A receiver as in claim 1 wherein the output of the cavity is coupled to the mixer by a loop having one end secured to the chassis and the other end secured to the input to the mixer.

5. A receiver as in claim 1 including a local oscillator, and an impedance matching network adapted to connect the output of the oscillator to the mixer.

6. A receiver as in claim 5 wherein said impedance matching network comprises an elongated metal strip in the form of a hairpin and resonant at the local frequency with the connection to the mixer disposed along said hairpin to provide an impedance match.

7. A receiver comprising a chassis for mounting the component parts, at least one wall extending upwardly from said chassis, a cover cooperating with said chassis and wall serving to define a cavity with said one wall forming one wall of the cavity, a cavity loop disposed within the cavity, said cavity loop having a portion external of the cavity, means for indirectly coupling an antenna to the external portion of the cavity loop, a mixer, and a loop disposed within the cavity having one end secured to said one wall and the other end to the mixer to couple the input of the mixer to the cavity.

8. A receiver as in claim 7 including a source of local frequency and an impedance matching network connecting the source of local frequency to the mixer, said impedance matching network comprising an elongated metal strip in the form of a hairpin and resonant at the local frequency with the connection to the mixer disposed along said hairpin to provide an impedance match.

9. A receiver comprising a chassis for mounting the component parts, at least one wall extending upwardly from said chassis, a cover cooperating with said chassis and one wall to define a cavity, said wall forming one wall of the cavity, a cavity loop disposed within the cavity and having a portion external of the cavity, said cavity loop being directly connected to the chassis at one end and capacitively coupled to the chassis at the other end, an antenna loop coupled to the external portion of the cavity loop to couple the antenna to the cavity, a mixer, a loop having one end secured to said one wall and its other end secured to the input of the mixer to couple the input of the mixer to the cavity, a local oscillator serving to provide a local frequency, and an impedance matching network adapted to connect the output of the oscillator to the mixer, said impedance matching network comprising an elongated metal strip in the form of a hairpin and resonant at the local frequency, the connection from the oscillator to the mixer being disposed along said hairpin to provide an impedance match.

References Cited in the file of this patent

UNITED STATES PATENTS

| | | |
|---|---|---|
| 2,235,010 | Chaffee | Mar. 18, 1941 |
| 2,425,352 | Sloss | Aug. 12, 1947 |
| 2,476,803 | Booth | July 19, 1949 |
| 2,476,885 | McClellan | July 19, 1949 |

OTHER REFERENCES

Digest—R.C.A. TN No. 151, August 19, 1958.